United States Patent [19]
Janisse et al.

[11] Patent Number: 5,130,587
[45] Date of Patent: Jul. 14, 1992

[54] FAN MOTOR 2-SPEED SWITCH WITH PROTECTIVE HOUSING

[75] Inventors: Dwight C. Janisse, St. Clair Beach, Canada; Jay R. Janisse, Birmingham, Mich.

[73] Assignee: Dwight C. Janisse & Associates, Inc., Troy, Mich.

[21] Appl. No.: 681,313

[22] Filed: Apr. 8, 1991

[51] Int. Cl.⁵ .............................................. H02K 5/22
[52] U.S. Cl. .............................................. 310/89
[58] Field of Search ........................... 310/71, 89, 90; 416/100; 417/423.14

[56] References Cited
U.S. PATENT DOCUMENTS

| | | | |
|---|---|---|---|
| 4,517,481 | 5/1985 | Breining | 310/71 |
| 4,535,397 | 8/1985 | May | 200/60 |
| 5,010,563 | 4/1991 | Laurent et al. | 310/71 |
| 5,015,155 | 5/1991 | Brown | 310/89 |

Primary Examiner—Steven L. Stephan
Assistant Examiner—D. Rebsch
Attorney, Agent, or Firm—Dykema Gossett

[57] ABSTRACT

A modular motor end dome for an industrial electric fan motor has a motor capacitor, and is provided on the rear end with a protective axial cavity in which may be seated the threaded mounting stem and attachment nut of an internally mounted pull chain electric motor control switch. Alternatively, an external 2-speed electric motor control switch can be employed with the modular motor end dome and with a drop cord connecting the external 2-speed electric motor control switch to the motor capacitor mounted in the modular motor end dome, and with the drop cord entering the modular motor end dome through the protective axial cavity.

10 Claims, 3 Drawing Sheets

FAN MOTOR 2-SPEED SWITCH WITH PROTECTIVE HOUSING

BACKGROUND OF THE INVENTION

1. Field of the Invention

The field of art to which this invention pertains may be generally located in the class of devices relating to electrical motors. Class 310, Electrical Generator or Motor Structure, United States Patent Office Classification, appears to be the applicable general area of art to which the subject matter similar to this invention has been classified in the past.

2. Description of the Prior Art

This invention relates to industrial electric fans which are mounted at elevated locations in an industrial plant, and wherein the fan includes a motor casing that is enclosed at its rear end by a removable modular end dome which has mounted thereon a power cord, a motor switch and motor capacitor. An example of a present day electrical fan motor modular end dome is disclosed in U.S. Pat. No. 4,517,481. A problem that exists in the assembly, and repair of such industrial electrical fan motors provided with the present day type modular end domes, is that when the fans are assembled, moved, disassembled or repaired, the workmen are not too careful, and in many instances the pull chain motor switch mounted in the modular end dome is damaged. The pull chain motor switch employed in the present day type modular end domes is mounted in a protruding position on the side of the end dome, and when industrial electric fans with such modular end domes are moved around they are sometimes thrown on the floor of a plant, and the neck member of the pull chain switch, which guides the pull chain, is broken. The pull chain switch necks are normally made from plastic, and if a present day type modular end dome is not handled carefully the plastic neck of a pull chain may inadvertently be brought into engagement with a plant post, or other member, which may break the protruding switch neck. Damage to the fan motor pull chain switches mounted on the side of the prior art or present day type modular end domes are the cause of a great percentage of repairs and switch replacements.

In view of the foregoing it is an object of the present invention to provide an improved modular end dome, for an industrial electric fan motor, which is constructed and arranged with a protective axial cavity in its rear spherical end, to provide protection for the neck of a fan motor pull chain switch mounted in the end dome, and which also provides protection for a drop cord strain relief connection member for a modular end dome if a 2-speed drop cord type fan motor switch is employed instead of a pull chain fan motor switch mounted directly in the modular end dome.

It is another object of the present invention to provide an improved modular end dome for an industrial electric fan motor which is shorter in overall length then the prior art modular end domes, whereby the modular end dome may be shipped or stored in a shorter package, and thereby effect a savings in packaging and shipping of such an improved modular end dome.

It is still another object of the present invention to provide a modular end dome for industrial electric fan motors which when used with a pull chain fan motor switch, the pull chain is always in the same axial position and cannot be inadvertently mounted in a position where the pull chain is positioned upwardly or in any other disadvantageous position, as is possible with the prior art modular end domes wherein the pull chain switch is mounted in a protruding position on the side of the modular end dome.

SUMMARY OF THE INVENTION

In accordance with the invention, an electric fan motor casing is enclosed at its rear end by a sheet metal modular end dome which is attached to the fan motor casing by a plurality of screws received within bayonet slots defined in the end dome. The modular end dome is provided on its spherical shaped rear end with an axial cavity which extends inwardly and provides a protective recess for the neck of a pull chain switch mounted in the end dome, and which is extended outwardly from the dome or alternatively to protect the drop cord strain relief connection member for a 2-speed drop cord fan motor switch.

The modular end dome of the present invention also includes a novel mounting bracket seated in the end dome for selectively seating and retaining a pull chain switch and a motor capacitor in such a manner that the pull chain switch can be removed with the motor capacitor and mounting bracket remaining as a unit in a its fixed position within the end dome.

DESCRIPTION OF THE PREFERRED EMBODIMENTS

Figure 1:
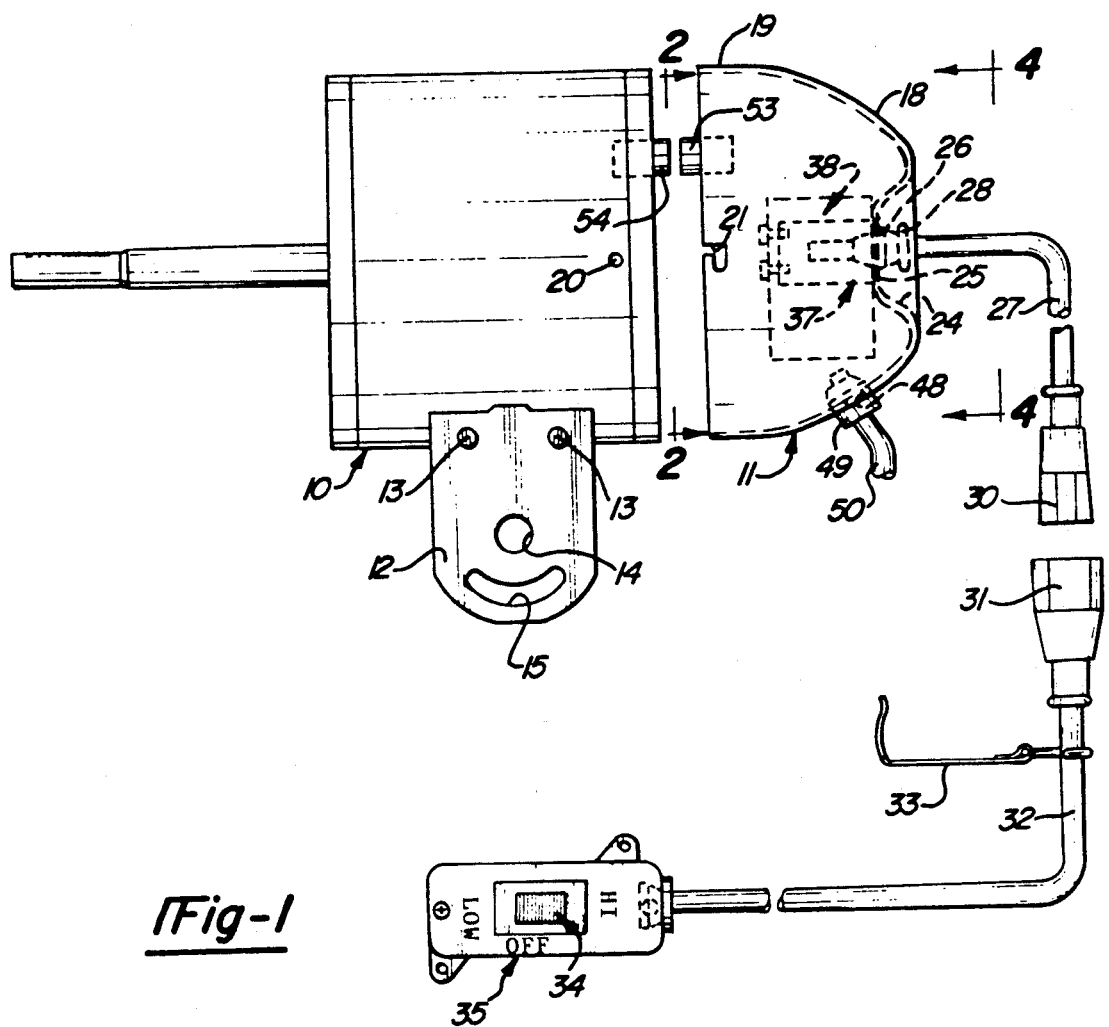
FIG. 1 is an elevation view of an industrial electric fan motor assembly made in accordance with the principles of the present invention, and shown with the modular end dome of the present invention spaced apart from the electric fan motor, and provided with a 2-speed drop cord switch assembly.

A fan motor assembly incorporating the modular motor end dome of the invention is illustrated in FIG. 1. The motor is generally indicated by the numeral 10. The modular motor end dome is generally indicated by the numeral 11. The fan motor 10 is provided with a mounting bracket 12 which is fixed to the casing of the fan motor 10 by any suitable means, as by welding at the two points indicated by the numeral 13. The mounting bracket 12 is provided with a pivot pin hole 14 for receiving a suitable pivot pin for mounting the fan motor 10 upon a supporting bracket, not shown, which may be attached to a wall surface, a floor stand or other conventional fan support structure. The bracket 12 includes an adjustment screw receiving slot 15 for locking the angular position of the fan motor 10 on its supporting structure.

The motor end dome 11 encloses the rear end of the casing of the fan motor 10 in a conventional manner and includes a substantially spherical rear end portion 18 which blends into the cylindrical front end portion 19 that telescopes over the rear end of the adjacent motor casing of the fan motor 10. The motor end dome 11 is fixed to the casing of the fan motor 10 in a conventional manner which includes plurality of screws 20 threaded into the casing of the fan motor 10 and mating bayonet type offset slots 21 that are formed in the front end portion 19 of the modular motor end dome 11 at positions that correspond to the positions of the screws 20, whereby the end dome 11 may be readily mounted on the rear end of the casing of the fan motor 10, and also removed therefrom merely by loosening the screws 20 slightly and rotating the end dome 11, and sliding the end dome from the rear end of the casing of the fan motor 10. The modular motor end dome 11 is mounted on the casing of the fan motor 10 by reversing the last described procedure.

Figure 2:
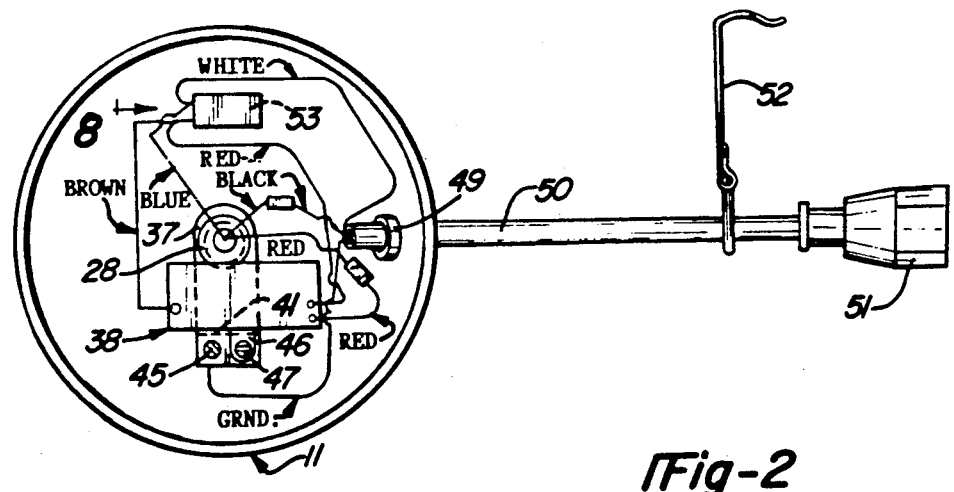
FIG. 2 is a left end view of the modular end dome shown in FIG. 1, taken along the line 2—2 thereof, and looking in the direction of the arrows and rotated 90 degrees.
Figure 4:
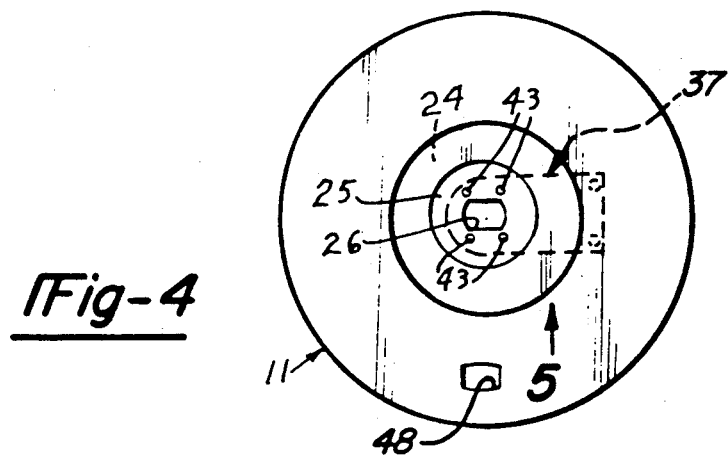
FIG. 4 is a rear end elevation view of the modular end dome shown in FIG. 1, taken along the line 4—4 thereof, and looking in the direction of the arrows, and with parts broken away.

In accordance with the invention, the spherical rear end portion 18 of the modular motor end dome 11 is provided with a protective axial cavity 24 which has an inner end wall 25 having a flat surface that is formed perpendicular to the longitudinal axis of the end dome 11 and the fan motor 10. It will be understood, that the modular motor end dome 11 may be selectively provided with a pull chain switch mounted therein for controlling the operation of the fan motor 10, or a 2-speed drop cord switch. FIGS. 1 and 2 illustrate the application of the invention to an embodiment wherein the modular motor end dome 11 is operatively associated with a 2-speed drop cord switch. As shown in FIG. 4, the inner end wall 25 of the protective axial cavity 24 is provided with a centrally formed hole 26 which is particularly shaped for mounting therein what is known as a HEYCO fitting. The HEYCO fitting hole 26 has two parallel sides with rounded ends, as shown in FIG. 4.

Figure 3:
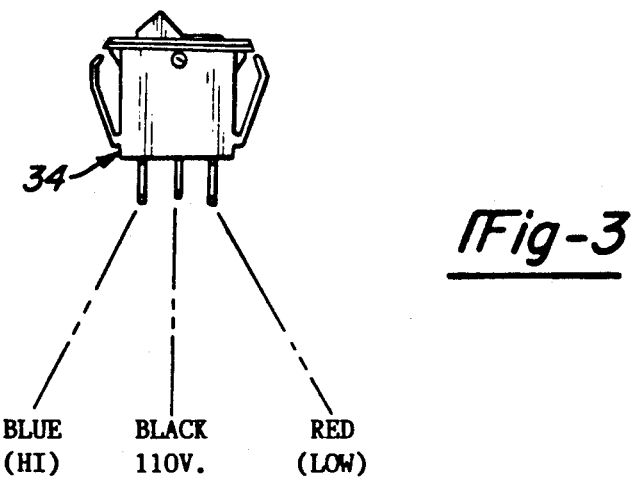
FIG. 3 is a side elevation view of a 2-speed switch employed in the 2-speed drop cord switch assembly illustrated in FIG. 1.

As shown in FIG. 1, the HEYCO fitting hole 26 has operatively mounted therein the one end of a switch control cord by means of a HEYCO fitting or strain relief connection member 28. The HEYCO fittings 28 are standard or conventional fittings, and they are available from the HEYCO Molded Products, Inc., Box 160, Kenilworth, N.J., 07033 under Model No. 6N3-4. The other end of the switch control cord 27 is provided w a conventional female connector 30 which is adapted to be received in a conventional male connector 31 on one end of a switch control cord 32. The connector members 30 and 31 are operatively held together by a conventional metal clamp member 33. The other end of the switch control cord 32 is operatively connected to a drop cord 2-speed switch, generally indicated by the numeral 34. A suitable 2-speed switch 34 is illustrated in FIG. 3, and it comprises what is known as a MCGILL rocker switch Model No. 0805-1253, that is available from the McGill Switch Co., a Division of the McGill Manufacturing Co., Inc. of Valparaiso, Ind., 46383. The switch 34 is a 2-speed switch that is operatively mounted in a plastic switch box, generally designated by the numeral 35. The switch 34 has 3 positions namely, a low speed position, a high speed position, and an "off" position.

Figure 5:
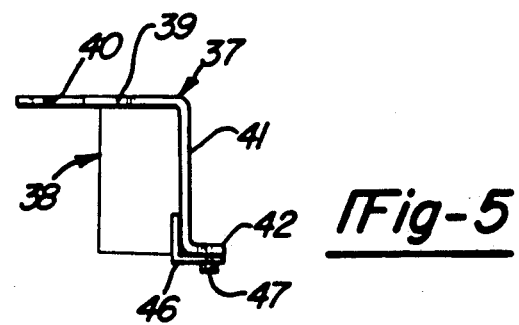
FIG. 5 is side view of the switch and motor capacitor bracket shown in FIG. 4, taken in the direction of the arrow marked "5".

As shown in FIGS. 2 and 4, a metal bracket, generally indicated by the numeral 37, is fixedly mounted in the modular motor end dome 11 and it fixedly supports a conventional motor capacitor, generally indicated by the numeral 38, in FIGS. 1 and 2. As shown in FIG. 5, the metal bracket 37 has a first flat end portion 39 that has a HEYCO fitting shaped hole 40 formed through the one end thereof. A second bracket portion or leg 41 has one end thereof, integrally formed on the other end of the bracket flat end portion 39, and a third flat end portion or flange 42 is integrally formed on the other end of the bracket leg 41. As shown in FIG. 4, the bracket flat end portion 39, with the HEYCO fitting hole 40, is positioned in the modular motor end dome 11 with its HEYCO fitting hole 40 aligned with the HEYCO fitting hole 26 in the flat center end wall 25 of the protective axial cavity 24. The bracket flat end portion 39 is fixedly secured to the flat center end wall 25 of the protective axial cavity 24 by projection welding at the points indicated by the numeral 43 (FIG. 4).

As best seen in FIGS. 2 and 5, the motor capacitor 38 is seated on the bracket portions 39 and 41. The motor capacitor 38 has a rectangular body which is provided with a metal tang or attachment bracket 46. The capacitor attachment bracket 46 extends over the outer face of the bracket flange 42, and it is fixedly secured thereto by a suitable attachment screw 47. The numeral 45 in FIG. 2 designates a ground screw.

The modular motor end dome 11 is provided with a second HEYCO fitting hole 48, as shown in FIGS. 1 and 4. Operatively mounted in the HEYCO fitting hole 48 is a HEYCO fitting or strain relief connection member 49 on one end of a conventional power cord 50. As shown in FIG. 2, the power cord 50 has formed on the other end thereof, the male connector member 51 and a conventional connector clamp 52 for connecting the power cord 50 to a suitable power extension cord for connecting the fan motor 10 to a power source.

Appropriate conventional electrical conductors are shown in FIG. 2, and they have been marked with the usual color scheme for cooperation with the mating color coded electrical conductors in the power cord 50, the drop cords 27 and 32 and the MCGILL switch 34. The color code prongs on the MCGILL switch 34 are illustrated in FIG. 3, and they match the same color codes for the electrical conductors shown in FIG. 2. The electrical conductors shown in FIG. 2 are connected to a conventional electrical receptacle known as a MOLEX connector and designated by the numeral 53 in FIGS. 1, 2 and 8. As shown in FIG. 1, the electrical connector 53 cooperates with a mating electrical connector 54 mounted on the fan motor 10 and having appropriate conductors, not shown, which connect to the fan motor 2-speed field coil and other electrical components located in the fan motor 10. Thus, by connecting the electrical connectors 53 and 54, the appropriate electrical connections are made between the electrical components within the modular motor end dome 11 and the electrical components within the fan motor 10.

Figure 6:
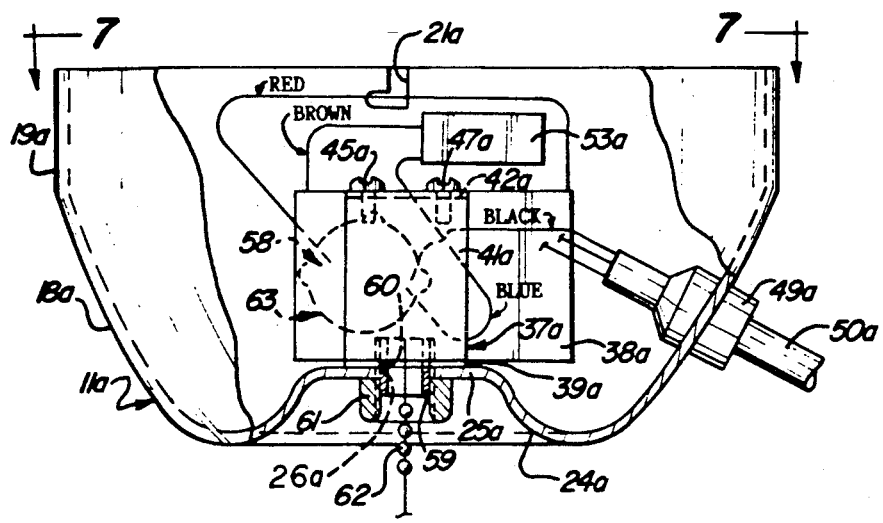
FIG. 6 is a side elevation view, with parts broken away, of a modular end dome made in accordance with the invention and showing a pull chain switch carried therein.
Figure 7:
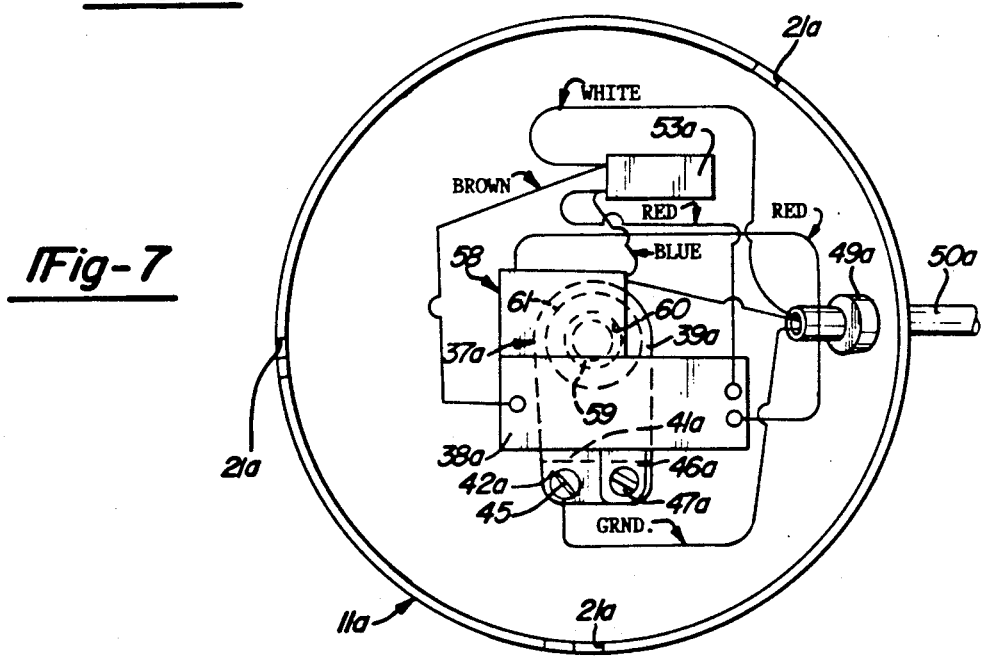
FIG. 7 is a top view of the modular end dome shown in FIG. 6, taken along the line 7—7 thereof, and looking in the direction of the arrows.
Figure 8:
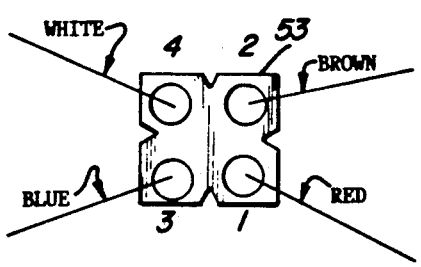
FIG. 8 is an end view of a wiring receptacle employed in the wiring circuit shown in FIGS. 2, 6 and 7, taken in the direction of the arrow marked 8 in FIG. 2.

FIGS. 6 and 7 illustrate a second embodiment of the invention and the parts thereof which correspond to the parts of the first embodiment of FIGS. 1 thru 5 and 8 have been marked with the same reference numerals followed by the small letter "a". The embodiment of FIGS. 6-8 illustrate the modular motor end dome of the invention being employed with a conventional pull chain switch instead of a remotely positioned 2-speed drop cord switch.

As shown in FIG. 6, a pull chain motor switch, generally indicated by the numeral 58, is seated on the support bracket portion 39a and it is provided with a conventional threaded stem 59 which extends through a round hole 60 that is formed through the bracket portion 39a and the protective axial cavity flat end wall 25a. The outer end of the switch stem 59 is threadably mounted in an attachment nut 61, and held in place in the end dome 11 by the attachment nut 61 in the protective axial cavity or recess 24a. The numeral 62 designates the pull chain for the switch 58. As shown in FIG. 6, the side wall of the protective axial cavity 24a flares convexly outward and terminates with a rounded periphery which provides smooth guidance for the pull chain 62. The numeral 63 in FIG. 6, generally designates a rotary switch arm which is mounted internally in the conventional pull chain motor switch 58.

What is claimed is:

1. In an electric fan motor having a motor field coil and a motor casing which has a rear end enclosed by a detachable sheet metal end dome, and wherein said end dome carries therein mounting means for supporting a motor capacitor, a power cord is mounted on the end dome, an electric motor switch means is operatively connected to electric conductors within said end dome which interconnect said power cord and motor capacitor to the motor field coil, the improvement wherein:
   (a) said detachable end dome has a open front end adapted to be detachably mounted on the motor casing rear end, and a rear end enclosed by a rear end wall;
   (b) said end dome rear wall has an inwardly extended, protective axial cavity formed therein which is disposed on the longitudinal axis of the end dome;
   (c) said protective axial cavity has an inner end wall through which is formed an opening; and
   (d) a portion of the electric motor switch means is disposed in said opening.

2. An electric fan motor as defined in claim 1, wherein:
   (a) said motor capacitor is fixedly supported on said mounting means in the end dome, and said mounting means comprises a bracket having one end fixed to the inner side of said protective axial cavity inner end wall.

3. An electric fan motor as defined in claim 2, wherein:
   (a) said mounting means bracket is welded to said inner side of said cavity inner end wall.

4. An electric fan motor as defined in claim 2, wherein:
   (a) said electric motor switch means comprises a pull chain switch mounted in said end dome and seated on said mounted means bracket, and said portion of the electric switch means disposed in said protective axial cavity opening comprises a pull chain switch threaded mounting stem extending through an opening formed through said one end of the mounting means bracket and through the opening formed through said protective axial cavity inner end wall; and
   (b) an attachment nut is positioned in said protective axial cavity and is threadably mounted on said threaded mounting stem to fixedly secure the pull chain switch in the end dome, and with the pull chain for the pull chain switch extending through said threaded mounting stem to the exterior of the end dome.

5. An electric fan motor as defined in claim 2, wherein:
   (a) said electric switch means is a 2-speed electric switch disposed exteriorly of the end dome and connected to said capacitor and electric conductors with the end dome, by said portion of the electric motor switch means disposed in said opening in the inner end wall of the protective axial cavity, and said last named portion of the electric motor switch means comprises a drop cord and a strain relief connector member.

6. An electric fan motor assembly comprising
   (a) a field coil and a casing;
   (b) a detachable end dome enclosing the rear end of the casing having an open front end and a closed rear end wherein the open front end is adapted to be detachable mounted on the casing rear end and the closed rear end having a rear end wall;
   (c) mounting means within the end dome for supporting a motor capacitor;
   (d) a power cord mounted on the end dome; and
   (e) an electric motor switch operatively connected to electrical conductors within the end dome which interconnect the power cord and motor capacitor to the field coil;
   wherein the rear end wall of the end dome has an inwardly extending, protective axial cavity formed therein and wherein at least a portion of the electric switch is mounted within the axial cavity.

7. An electric fan motor assembly as defined in claim 6, wherein the electric switch is pull chain switch.

8. An electric fan motor assembly as defined in claim 6, wherein the electric switch is a 2-speed electric motor switch assembly consisting of a drop cord, a strain relief connecting member, and a 2-speed electric motor switch.

9. An electric fan motor assembly as defined in claim 7, wherein the axial cavity is disposed on the longitudinal axis of the end dome.

10. An electric fan motor assembly as defined in claim 8, where the axial cavity is disposed on the longitudinal axis of the end dome.

* * * * *

UNITED STATES PATENT AND TRADEMARK OFFICE
CERTIFICATE OF CORRECTION

PATENT NO. : 5,130,587  
DATED : July 14, 1992  
INVENTOR(S) : Dwight C. Janisse et al It is certified that error appears in the above-indentified patent and that said Letters Patent is hereby corrected as shown below:

Column 1 and 2 should be deleted to appear as per attached sheet.

Signed and Sealed this

Nineteenth Day of July, 1994

Attest:

BRUCE LEHMAN

*Attesting Officer*     Commissioner of Patents and Trademarks

FAN MOTOR 2-SPEED SWITCH WITH PROTECTIVE HOUSING

BACKGROUND OF THE INVENTION

1. Field of the Invention

The field of art to which this invention pertains may be generally located in the class of devices relating to electrical motors. Class 310, Electrical Generator or Motor Structure, United States Patent Office Classification, appears to be the applicable general area of art to which the subject matter similar to this invention has been classified in the past.

2. Description of the Prior Art

This invention relates to industrial electric fans which are mounted at elevated locations in an industrial plant, and wherein the fan includes a motor casing that is enclosed at its rear end by a removable modular end dome which has mounted thereon a power cord, a motor switch and motor capacitor. An example of a present day electrical fan motor modular end dome is disclosed in U.S. Pat. No. 4,517,481. A problem that exists in the assembly, and repair of such industrial electrical fan motors provided with the present day type modular end domes, is that when the fans are assembled, moved, disassembled or repaired, the workmen are not too careful, and in many instances the pull chain motor switch mounted in the modular end dome is damaged. The pull chain motor switch employed in the present day type modular end domes is mounted in a protruding position on the side of the end dome, and when industrial electric fans with such modular end domes are moved around they are sometimes thrown on the floor of a plant, and the neck member of the pull chain switch, which guides the pull chain, is broken. The pull chain switch necks are normally made from plastic, and if a present day type modular end dome is not handled carefully the plastic neck of a pull chain may inadvertently be brought into engagement with a plant post, or other member, which may break the protruding switch neck. Damage to the fan motor pull chain switches mounted on the side of the prior art or present day type modular end domes are the cause of a great percentage of repairs and switch replacements.

In view of the foregoing it is an object of the present invention to provide an improved modular end dome, for an industrial electric fan motor, which is constructed and arranged with a protective axial cavity in its rear spherical end, to provide protection for the neck of a fan motor pull chain switch mounted in the end dome, and which also provides protection for a drop cord strain relief connection member for a modular end dome if a 2-speed drop cord type fan motor switch is employed instead of a pull chain fan motor switch mounted directly in the modular end dome.

It is another object of the present invention to provide an improved modular end dome for an industrial electric fan motor which is shorter in overall length then the prior art modular end domes, whereby the modular end dome may be shipped or stored in a shorter package, and thereby effect a savings in packaging and shipping of such an improved modular end dome.

It is still another object of the present invention to provide a modular end dome for industrial electric fan motors which when used with a pull chain fan motor switch, the pull chain is always in the same axial position and cannot be inadvertently mounted in a position where the pull chain is positioned upwardly or in any other disadvantageous position, as is possible with the prior art modular end domes wherein the pull chain switch is mounted in a protruding position on the side of the modular end dome.

SUMMARY OF THE INVENTION

In accordance with the invention, an electric fan motor casing is enclosed at its rear end by a sheet metal modular end dome which is attached to the fan motor casing by a plurality of screws received within bayonet slots defined in the end dome. The modular end dome is provided on its spherical shaped rear end with an axial cavity which extends inwardly and provides a protective recess for the neck of a pull chain switch mounted in the end dome, and which is extended outwardly from the dome or alternatively to protect the drop cord strain relief connection member for a 2-speed drop cord fan motor switch.

The modular end dome of the present invention also includes a novel mounting bracket seated in the end dome for selectively seating and retaining a pull chain switch and a motor capacitor in such a manner that the pull chain switch can be removed with the motor capacitor and mounting bracket remaining as a unit in a its fixed position within the end dome.

BRIEF DESCRIPTION OF THE DRAWING

FIG. 1 is an elevation view of an industrial electric fan motor assembly made in accordance with the principles of the present invention, and shown with the modular end dome of the present invention spaced apart from the electric fan motor, and provided with a 2-speed drop cord switch assembly.

FIG. 2 is a left end view of the modular end dome shown in FIG. 1, taken along the line 2—2 thereof, and looking in the direction of the arrows and rotated 90 degrees.

FIG. 3 is a side elevation view of a 2-speed switch employed in the 2-speed drop cord switch assembly illustrated in FIG. 1.

FIG. 4 is a rear end elevation view of the modular end dome shown in FIG. 1, taken along the line 4—4 thereof, and looking in the direction of the arrows, and with parts removed.

FIG. 5 is side view of the switch and motor capacitor bracket shown in FIG. 4, taken in the direction of the arrow marked "5".

FIG. 6 is a side elevation view, with parts broken away, of a modular end dome made in accordance with the invention and showing a pull chain switch carried therein.

FIG. 7 is a top view of the modular end dome shown in FIG. 6, taken along the line 7—7 thereof, and looking in the direction of the arrows.

FIG. 8 is an end view of a wiring receptacle employed in the wiring circuit shown in FIGS. 2, 6 and 7, taken in the direction of the arrow marked 8 in FIG. 2.

DESCRIPTION OF THE PREFERRED EMBODIMENTS

A fan motor assembly incorporating the modular motor end dome of the invention is illustrated in FIG. 1. The motor is generally indicated by the numeral 10. The modular motor end dome is generally indicated by the numeral 11. The fan motor 10 is provided with a mounting bracket 12 which is fixed to the casing of the fan motor 10 by any suitable means, as by welding at the